US012664099B2

(12) United States Patent
Bradshaw

(10) Patent No.: US 12,664,099 B2
(45) Date of Patent: Jun. 23, 2026

(54) STORAGE-SIDE PAGE TABLES FOR MEMORY SYSTEMS

(71) Applicant: SK Hynix NAND Product Solutions Corp., Rancho Cordova, CA (US)

(72) Inventor: Samuel Bradshaw, Sacramento, CA (US)

(73) Assignee: SK Hynix Nand Product Solutions Corp, Rancho Cordova, CA (US)

( * ) Notice: Subject to any disclaimer, the term of this patent is extended or adjusted under 35 U.S.C. 154(b) by 48 days.

(21) Appl. No.: 18/375,363

(22) Filed: Sep. 29, 2023

(65) Prior Publication Data

US 2025/0110892 A1 Apr. 3, 2025

(51) Int. Cl.
*G06F 12/1009* (2016.01)
(52) U.S. Cl.
CPC ................................. *G06F 12/1009* (2013.01)
(58) Field of Classification Search
CPC ......... G06F 12/1009; G06F 2212/1024; G06F 2212/657; G06F 2212/7201
See application file for complete search history.

(56) References Cited

U.S. PATENT DOCUMENTS

| | | | | |
|---|---|---|---|---|
| 6,198,688 B1 * | 3/2001 | Choi | ................... | G06F 13/4243 |
| | | | | 365/51 |
| 7,519,764 B2 * | 4/2009 | Kim | ........................ | G06F 11/08 |
| | | | | 711/202 |
| 2007/0043929 A1 | 2/2007 | Safford et al. | | |
| 2008/0046630 A1 * | 2/2008 | Lasser | ................. | G06F 13/1694 |
| | | | | 711/E12.002 |

| | | | | |
|---|---|---|---|---|
| 2008/0126678 A1 * | 5/2008 | Mizushima | ........ | G11C 29/4401 |
| | | | | 711/E12.008 |
| 2008/0158958 A1 * | 7/2008 | Sokolov | ................. | G11C 16/26 |
| | | | | 365/185.08 |
| 2010/0049940 A1 | 2/2010 | Ware | | |
| 2011/0320762 A1 | 12/2011 | Soares et al. | | |

(Continued)

FOREIGN PATENT DOCUMENTS

CN 115885267 A 3/2011

OTHER PUBLICATIONS

SK Hynix NAND Product Solutions Corp. (dba Solidigm), PCT/US2024/048608, International Search Report and Written Opinion, Jan. 6, 2025, 10 pgs.

*Primary Examiner* — Larry T Mackall
(74) *Attorney, Agent, or Firm* — Morgan, Lewis & Bockius LLP

(57) ABSTRACT

This application is directed to accessing data in a memory system of an electronic system. The memory system a storage-side DRAM and one or more memory channels. The memory system receives a memory access request for target data stored in the memory system, and the memory access request includes a target virtual address of the target data. In response to the memory access request, the memory system searches a page table of the storage-side dynamic random-access memory (DRAM) for a target physical address mapped to the target virtual address of the target data. The page table includes mappings between a plurality of virtual addresses and a plurality of physical addresses of the storage-side DRAM. Based on a search result, the memory system extracts the target data stored in one of the storage-side DRAM and the one or more memory channels according to the target physical address.

20 Claims, 7 Drawing Sheets

(56)  References Cited

U.S. PATENT DOCUMENTS

2015/0356020 A1* 12/2015 Desai .................. G06F 12/0897
                                                      711/103
2017/0300422 A1* 10/2017 Szubbocsev ........ G06F 12/1009
2018/0121121 A1*  5/2018 Mehra ..................... G06F 3/061
2021/0405913 A1* 12/2021 Stonelake ........... G06F 11/3037
2022/0164123 A1*  5/2022 Kim ...................... G06F 3/0659
2023/0080030 A1    3/2023 Bradshaw et al.
2023/0138215 A1*  5/2023 Hiwada .............. G06F 12/0246
                                                      711/103

* cited by examiner 204A, 204B, and 204N: collectively 204
206A and 206B: collectively 206
214A, 214B, and 214N: collectively 214
216A, 216B, and 216N: collectively 216

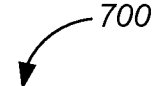

Receive a memory access request for target data stored in the memory system. 702

The memory access request includes a target virtual address of the target data. 704

The memory system includes a storage-side dynamic random-access memory (DRAM) and one or more memory channels 706

In response to the memory access request:

Search a page table of the storage-side DRAM for a target physical address mapped to the target virtual address of the target data. 708

The page table includes mappings between a plurality of virtual addresses and a plurality of physical addresses. 710

Based on a search result, extract the target data stored in one of the storage-side DRAM and the one or more memory channels according to the target physical address in the page table. 712

Figure 7

STORAGE-SIDE PAGE TABLES FOR MEMORY SYSTEMS

TECHNICAL FIELD

This application relates generally to memory management including, but not limited to, methods, systems, and non-transitory computer-readable media for accessing data stored in a memory system of an electronic system.

BACKGROUND

Memory is applied in a computer system to store instructions and data. Particularly, the computer system relies on non-volatile memory to keep instructions and data stored thereon if the computer system is decoupled from a power source. Examples of the secondary memory include, but are not limited to, hard disk drives (HDDs) and solid-state drives (SSDs). Many electronic systems (e.g., servers, Just a Bunch of Disks (JBOD), racks, appliances) include a large number (e.g., 4-30) of SSDs. Further, computer systems can rely on dynamic random access memory (DRAM) for storing and retrieving data and instructions that do not require power off persistence. Examples include application and kernel data structures that are rebuilt when the computer system boots and loads its operating system and loads and runs applications. Both SSDs and DRAM devices can be configured to implement different memory functions under the control of its host device. Generally, DRAM devices support byte addressable accesses called Loads (reads from the memory device) and Stores (writes to the memory device), while SSDs support indirect command and response protocols using larger granularity Logical Block Addressing schemes. With the introduction of protocols like Compute Express Link, byte addressable DRAM devices can now be attached to the computer system via a peripheral bus similar to Peripheral Component Interconnect Express (PCIe). A processor core uses logical addressing methods, which rely on translation tables to convert the logical address to a physical address. These tables are typically located in DRAM memory. For performance reasons, frequently used logical to physical associations are cached in translation lookaside buffer (TLB). For cost and capacity/density reasons, system designers have desired to put cheaper and slower memory like NAND Flash where DRAM memory has traditionally been used. However, this approach has been challenging because the computer system's processor architectures do not scale well to the high degrees of concurrent loads and stores necessary to prevent excessive processor stalling when a load or store operations takes a long time to complete. A processor core enters a stall waiting for a load and store operations from memory to complete and can not issue more overlapping loads and stores beyond the boundary of the reorder window. It would be beneficial to develop an efficient and effective mechanism to manage data access requests in an electronic system.

SUMMARY

Various embodiments of this application are directed to methods, systems, devices, and non-transitory computer-readable media for accessing data stored in a memory system of an electronic system by way of a storage-side dynamic random-access memory (DRAM). The electronic system includes a host device coupled to the memory system. In some embodiments, the host device is coupled to the memory system via a Compute Express Link (CXL), which is a high-speed interconnect, industry-standard interface for communications between processors, accelerators, memory, storage, and other IO devices. The memory system hosts local page tables that describe mappings for memory in a global address space. These page tables of the memory system reflect a hierarchy of memory types that exist in the memory system. The memory system manipulates the page tables based on access pattern introspection and hot/cold separation, e.g., by placing the most frequently and/or recently accessed pages in the fastest tier of memory (e.g., DRAM) in the memory system. Further, the memory system communicates with the host device to manipulate host-side caches to purge stale information.

In some embodiments, the memory system includes storage-side DRAM for storing the local page tables that map a plurality of virtual addresses to a plurality of physical addresses of the storage-side DRAM and one or more memory channels. The memory system includes the DRAM and one or more different types of memory (e.g., a single-level cell (SLC) memory, a multiple-level cell (MLC) memory, a triple-level cell (TLC) memory, a quad-level cell (QLC) memory, a penta-level cell (PLC), or memory cells that can store any suitable number of data bits). Data pages are migrated among the DRAM and the one or more different types of memory in accordance with a determination whether the data pages are frequently or recently accessed or speculated to be accessed in the near future. By these means, the local page tables of the memory system shares workload of central processing unit (CPU) page table walks, thereby reducing host CPU involvement in some memory management unit (MMU) operations and improving overall system performance. A plurality of memory types are aggregated into a unified load/store pool, allowing memory cost arbitrage in a load/store memory pool. Latent memory accesses are hidden through existing mechanisms (page fault). Memory-side dedicated hardware is configured to cache a larger number of translation lookaside buffer (TLB) entries than the processors of the host device. A distributed TLB is created with one or more memory-side TLBs, complements processor-side TLBs, and offers a larger overall cache of translations. Further, the memory-side dedicated hardware is configured to walk the local page tables in a more efficient way than the host device, e.g., by placing co-incident page entries in the same DRAM row, alleviating row activation overhead.

In one aspect, a method is implemented to access data in a memory system of an electronic system. The memory system receives a memory access request for target data stored in the memory system, and the memory access request includes a target virtual address of the target data. The memory system includes a storage-side DRAM and one or more memory channels. In response to the memory access request, the memory system searches a page table of the storage-side DRAM for a target physical address mapped to the target virtual address of the target data. The page table includes mappings between a plurality of virtual addresses and a plurality of physical addresses of the storage-side DRAM. In response to the memory access request and based on a search result, the memory system extracts the target data stored in one of the storage-side DRAM and the one or more memory channels according to the target physical address corresponding to the target virtual address.

Some implementations of this application include an electronic system that includes one or more processors and memory having instructions stored thereon, which when executed by the one or more processors cause the processors to perform any of the above methods on a memory system (e.g., including one or more SSDs).

Some implementations of this application include a memory system that includes a plurality of memory devices (e.g., including one or more SSDs) and memory having instructions stored thereon, which when executed by the one or more processors cause the processors to perform any of the above methods on the memory system.

Some implementations include a non-transitory computer readable storage medium storing one or more programs. The one or more programs include instructions, which when executed by one or more processors cause the processors to implement any of the above methods on a memory system (e.g., including one or more SSDs).

These illustrative embodiments and implementations are mentioned not to limit or define the disclosure, but to provide examples to aid understanding thereof. Additional embodiments are discussed in the Detailed Description, and further description is provided there.

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 7 is a flow diagram of an example method for accessing data in a memory system, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic systems or devices with data storage capabilities.

This application is directed to methods, systems, devices, and non-transitory computer-readable media for accessing data stored in a memory system of an electronic system by way of a storage-side DRAM. The electronic system further includes a host device coupled to the memory system. The memory system hosts local page tables that describe mappings between a plurality of virtual addresses to a plurality of physical addresses of the storage-side DRAM and one or more memory channels. These page tables of the memory system reflects a hierarchy of memory types that exist in the memory system, and are manipulated based on access pattern introspection and hot/cold separation. Stated another way, data pages are migrated among the DRAM and the one or more different types of memory in accordance with a determination whether the data pages are frequently or recently accessed or via speculation to be accessed in the near future. By these means, the local page tables of the memory system shares workload of central processing unit (CPU) page table walks, allows memory cost arbitrage in a load/store memory pool of different memory types, hides latent memory accesses through existing mechanisms (page fault), and caches more TLB entries than the host device, thereby offering an efficient and effective mechanism to be applied in a memory system to manage data access requests received from its host device.

Figure 1:
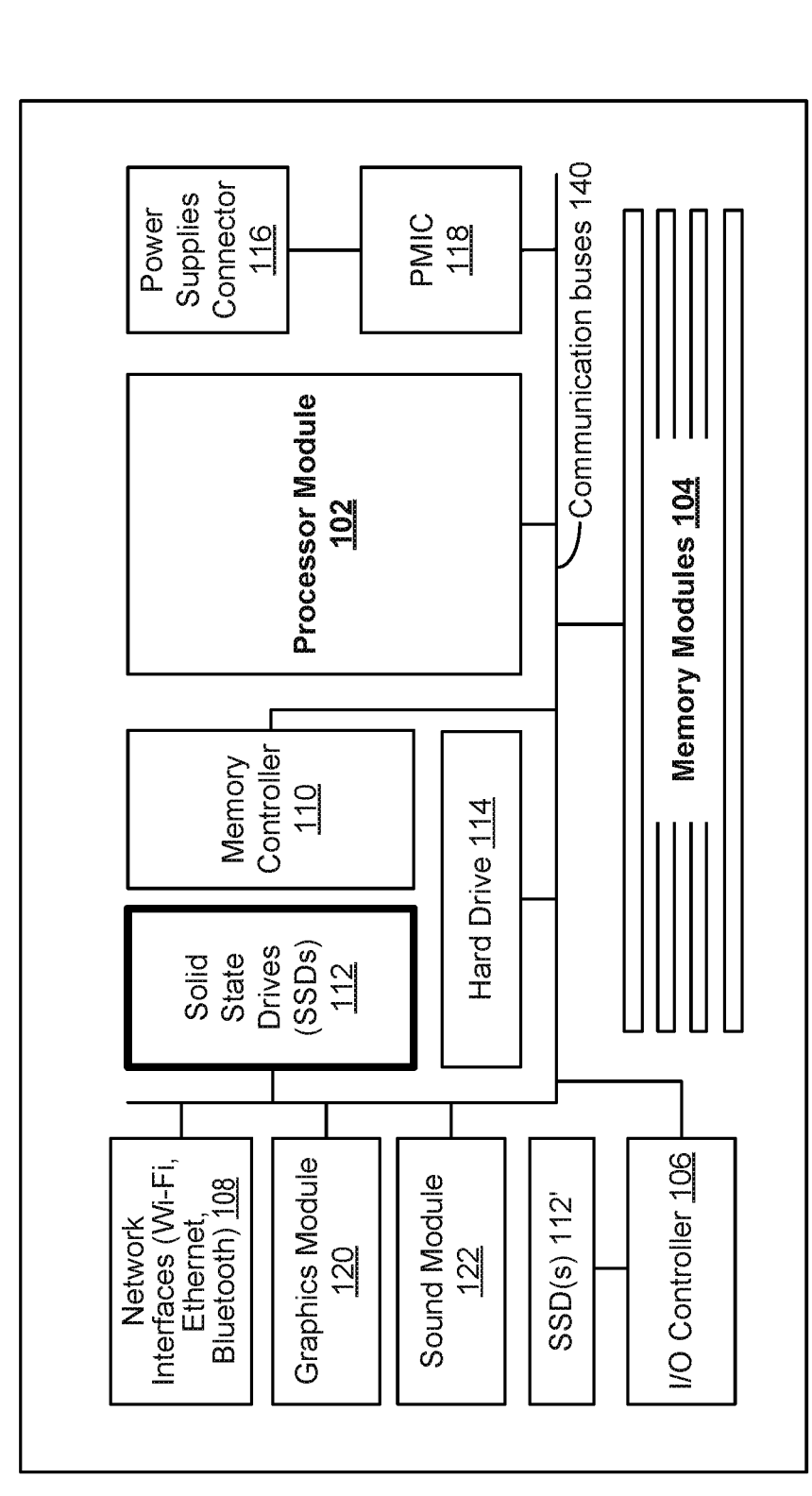
FIG. 1 is a block diagram of an example system module in a typical electronic system in accordance with some embodiments.

FIG. 1 is a block diagram of an example system module 100 in a typical electronic system in accordance with some embodiments. The system module 100 in this electronic system includes at least a processor module 102, memory modules 104 for storing programs, instructions and data, an input/output (I/O) controller 106, one or more communication interfaces such as network interfaces 108, and one or more communication buses 140 for interconnecting these components. In some embodiments, the I/O controller 106 allows the processor module 102 to communicate with an I/O device (e.g., a keyboard, a mouse or a track-pad) via a universal serial bus interface. In some embodiments, the network interfaces 108 includes one or more interfaces for Wi-Fi. Ethernet and Bluetooth networks, each allowing the electronic system to exchange data with an external source, e.g., a server or another electronic system. In some embodiments, the communication buses 140) include circuitry (sometimes called a chipset) that interconnects and controls communications among various system components included in system module 100.

In some embodiments, the memory modules 104 include high-speed random-access memory, such as DRAM, static random-access memory (SRAM), double data rate (DDR) dynamic random-access memory (RAM), or other random-access solid state memory devices. In some embodiments, the memory modules 104 include non-volatile memory, such as one or more magnetic disk storage devices, optical disk storage devices, flash memory devices, or other non-volatile solid state storage devices. In some embodiments, the memory modules 104, or alternatively the non-volatile memory device(s) within the memory modules 104, include a non-transitory computer readable storage medium. In some embodiments, memory slots are reserved on the system module 100 for receiving the memory modules 104. Once inserted into the memory slots, the memory modules 104 are integrated into the system module 100.

In some embodiments, the system module 100 further includes one or more components selected from a memory controller 110, SSDs 112, a hard disk drive (HDD) 114, power management integrated circuit (PMIC) 118, a graphics module 120, and a sound module 122. The memory controller 110 is configured to control communication between the processor module 102 and memory components, including the memory modules 104, in the electronic system. The SSDs 112 are configured to apply integrated circuit assemblies to store data in the electronic system, and in many embodiments, are based on NAND or NOR memory configurations. The HDD 114 is a conventional data storage device used for storing and retrieving digital information based on electromechanical magnetic disks. The power supply connector 116 is electrically coupled to receive an external power supply. The PMIC 118 is configured to modulate the received external power supply to other desired DC voltage levels, e.g., 5V, 3.3V or 1.8V, as required by various components or circuits (e.g., the processor module 102) within the electronic system. In some embodiments, the graphics module 120 is configured to generate a feed of output images to one or more display devices according to their desirable image/video formats. In some embodiments, the sound module 122 is configured to facilitate the input and output of audio signals to and from the electronic system under control of computer programs.

In some embodiments, the system module 100 further includes SSDs 112" coupled to the I/O controller 106 directly. Conversely, the SSDs 112 are coupled to the communication buses 140. In an example, the communication buses 140 operates in compliance with Peripheral Component Interconnect Express (PCIe or PCI-E), which is a serial expansion bus standard for interconnecting the processor module 102 to, and controlling, one or more peripheral devices and various system components including components 110-122.

Further, one skilled in the art knows that other non-transitory computer readable storage media can be used, as new data storage technologies are developed for storing information in the non-transitory computer readable storage media in the memory modules 104, SSDs 112 and 112', and HDD 114. These new non-transitory computer readable storage media include, but are not limited to, those manufactured from biological materials, nanowires, carbon nanotubes and individual molecules, even though the respective data storage technologies are currently under development and yet to be commercialized.

Figure 2:
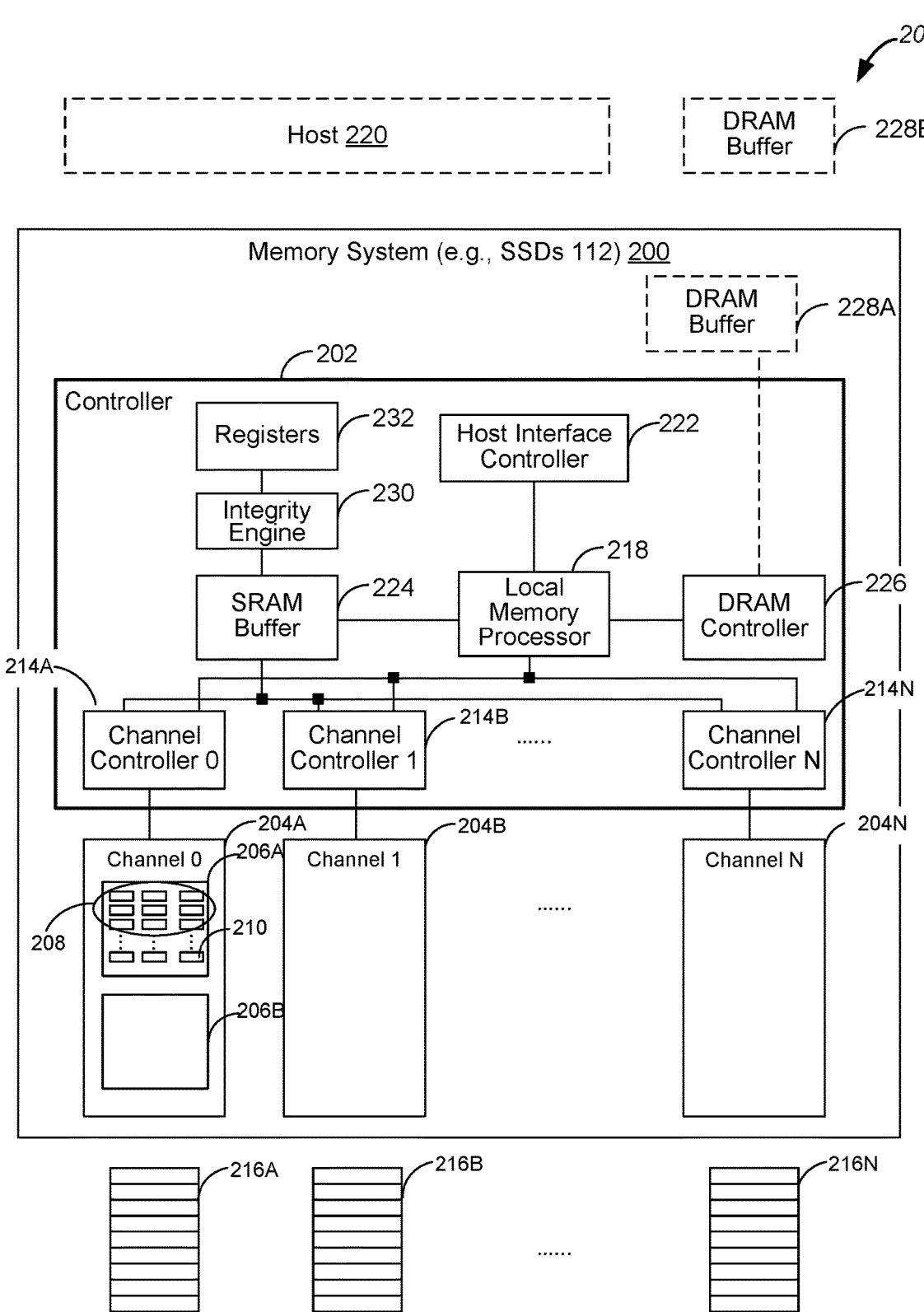
FIG. 2 is a block diagram of a memory system of an example electronic system having one or more memory access queues, in accordance with some embodiments.

FIG. 2 is a block diagram of a memory system 200 of an example electronic system having one or more memory access queues, in accordance with some embodiments. The memory system 200 is coupled to a host device 220 (e.g., a processor module 102 in FIG. 1) and configured to store instructions and data for an extended time, e.g., when the electronic system sleeps, hibernates, or is shut down. The host device 220 is configured to access the instructions and data stored in the memory system 200 and process the instructions and data to run an operating system and execute user applications. The memory system 200 further includes a controller 202 and a plurality of memory channels 204. Each memory channel 204 includes a plurality of memory cells. The controller 202 is configured to execute firmware level software to bridge the plurality of memory channels 204 to the host device 220. In some embodiments, a set of memory channels 204 forms a memory device (e.g., a SSD), and the memory system 200 includes one or more memory devices.

Each memory channel 204 includes on one or more memory packages 206 (e.g., two memory dies). In an example, each memory package 206 corresponds to a memory die. Each memory package 206 includes a plurality of memory planes 208, and each memory plane 208 further includes a plurality of memory pages 210. Each memory page 210 includes an ordered set of memory cells, and each memory cell is identified by a respective physical address. In some embodiments, the memory system 200 includes a plurality of superblocks. Each superblock includes a plurality of memory blocks each of which further includes a plurality of memory pages 210. For each superblock, the plurality of memory blocks are configured to be written into and read from the memory system via a memory input/output (I/O) interface concurrently. Optionally, each superblock groups memory cells that are distributed on a plurality of memory planes 208, a plurality of memory channels 204, and a plurality of memory dies 206. In an example, each superblock includes at least one set of memory pages, where each page is distributed on a distinct one of the plurality of memory dies 206, has the same die, plane, block, and page designations, and is accessed via a distinct channel of the distinct memory die 206. In another example, each superblock includes at least one set of memory blocks, where each memory block is distributed on a distinct one of the plurality of memory dies 206 includes a plurality of pages, has the same die, plane, and block designations, and is accessed via a distinct channel of the distinct memory die 206. The memory system 200 stores information of an ordered list of superblocks in a cache of the memory system 200. In some embodiments, the cache is managed by a host driver of the host device 220, and called a host managed cache (HMC).

In some embodiments, the memory system 200 includes a single-level cell (SLC) NAND flash memory chip, and each memory cell stores a single data bit. In some embodiments, the memory system 200 includes a multi-level cell (MLC) NAND flash memory chip, and each memory cell of the MLC NAND flash memory chip stores 2 data bits. In an example, each memory cell of a triple-level cell (TLC) NAND flash memory chip stores 3 data bits. In another example, each memory cell of a quad-level cell (QLC) NAND flash memory chip stores 4 data bits. In yet another example, each memory cell of a penta-level cell (PLC) NAND flash memory chip stores 5 data bits. In some embodiments, each memory cell can store any suitable number of data bits. Compared with the non-SLC NAND flash memory chips (e.g., MLC SSD, TLC SSD, QLC SSD, PLC SSD), the SSD that has SLC NAND flash memory chips operates with a higher speed, a higher reliability, and a longer lifespan, and however, has a lower device density and a higher price.

Each memory channel 204 is coupled to a respective channel controller 214 configured to control internal and external requests to access memory cells in the respective memory channel 204. In some embodiments, each memory package 206 (e.g., each memory die) corresponds to a respective queue 216 of memory access requests. In some embodiments, each memory channel 204 corresponds to a respective queue 216 of memory access requests. Further, in some embodiments, each memory channel 204 corresponds to a distinct and different queue 216 of memory access requests. In some embodiments, a subset (less than all) of the plurality of memory channels 204 corresponds to a distinct queue 216 of memory access requests. In some embodiments, all of the plurality of memory channels 204 of the memory system 200 corresponds to a single queue 216 of memory access requests. Each memory access request is optionally received internally from the memory system 200 to manage the respective memory channel 204 or externally from the host device 220 to write or read data stored in the respective channel 204. Specifically, each memory access request includes one of: a system write request that is received from the memory system 200 to write to the respective memory channel 204, a system read request that is received from the memory system 200 to read from the respective memory channel 204, a host write request that originates from the host device 220 to write to the respective memory channel 204, and a host read request that is received from the host device 220 to read from the respective memory channel 204. It is noted that system read requests (also called background read requests or non-host read requests) and system write requests are dispatched by a memory controller to implement internal memory management functions including, but are not limited to, garbage collection, wear levelling, read disturb mitigation, memory snapshot capturing, memory mirroring, caching, and memory sparing.

In some embodiments, in addition to the channel controllers 214, the controller 202 further includes a local memory processor 218, a host interface controller 222, an SRAM buffer 224, and a DRAM controller 226. The local memory processor 218 accesses the plurality of memory channels 204 based on the one or more queues 216 of memory access requests. In some embodiments, the local memory processor 218 writes into and read from the plurality of memory channels 204 on a memory block basis. Data of one or more memory blocks are written into, or read from, the plurality of channels jointly. No data in the same memory block is written concurrently via more than one operation. Each memory block optionally corresponds to one or more memory pages. In an example, each memory block to be written or read jointly in the plurality of memory channels 204 has a size of 16 KB (e.g., one memory page). In another example, each memory block to be written or read jointly in the plurality of memory channels 204 has a size of 64 KB (e.g., four memory pages). In some embodiments, each page has 16 KB user data and 2 KB metadata. Additionally, a number of memory blocks to be accessed jointly and a size of each memory block are configurable for each of the system read, host read, system write, and host write operations.

In some embodiments, the local memory processor 218 stores data to be written into, or read from, each memory block in the plurality of memory channels 204 in an SRAM buffer 224 of the controller 202. Alternatively, in some embodiments, the local memory processor 218 stores data to be written into, or read from, each memory block in the plurality of memory channels 204 in a DRAM buffer 228A that is included in memory system 200, e.g., by way of the DRAM controller 226. Alternatively, in some embodiments, the local memory processor 218 stores data to be written into, or read from, each memory block in the plurality of memory channels 204 in a DRAM buffer 228B that is main memory used by the processor module 102 (FIG. 1). The local memory processor 218 of the controller 202 accesses the DRAM buffer 228B via the host interface controller 222.

In some embodiments, data in the plurality of memory channels 204 is grouped into coding blocks, and each coding block is called a codeword. For example, each codeword includes n bits among which k bits correspond to user data and (n-k) corresponds to integrity data of the user data, where k and n are positive integers. In some embodiments, the memory system 200 includes an integrity engine 230 (e.g., an LDPC engine) and registers 232 including a plurality of registers or SRAM cells or flip-flops and coupled to the integrity engine 230. The integrity engine 230 is coupled to the memory channels 204 via the channel controllers 214 and SRAM buffer 224. Specifically, in some embodiments, the integrity engine 230) has data path connections to the SRAM buffer 224, which is further connected to the channel controllers 214 via data paths that are controlled by the local memory processor 218. The integrity engine 230 is configured to verify data integrity for each coding block of the memory channels 204.

In some embodiments, the host device 220 is coupled to the memory system 200 via a Compute Express Link (CXL), which is a high-speed interconnect, industry-standard interface for communications between processors, accelerators, memory, storage, and other IO devices. CXL increases efficiency by allowing composability, scalability, and flexibility for heterogeneous and distributed computer architectures. The key advantage of CXL is the expansion of the memory for compute nodes, filling the gap for data-intensive applications that require high bandwidth, capacity, and low latency. CXL infrastructure enables multiple tiers of switches in front of load/store memory, increasing latency.

In some embodiments, the memory system 200 virtualizes a variety of memory types (DRAM. NAND, emerging memories) with varying latency characteristics into a load/store pool mapped into an address space of the host device 220. In some embodiments, the host device 220 uses page faults to hide the latency of a load operation. A page fault and hardware context switch 402 (FIG. 4) is an exception that invokes a software exception handler. That exception handler can be designed to estimate a latency of a load operation and determine whether to allow the application running on host device 220 to wait on the load operation or to invoke kernel or hypervisor capabilities to reschedule another thread on the host device 220 while the load operation is serviced in the back. In some embodiments, one or more host page tables 302 (FIGS. 3-6) contain the mappings of logical pages to physical pages and are stored in close to a processor DRAM 228B. Alternatively, in some embodiments, one or more supplemental page tables 502 (FIGS. 5 and 6) contain the mappings of logical pages to physical pages and are stored in a storage-side DRAM 228A of the memory system 200. In some embodiments, an application accesses a logical page without a cache of the existing logical to physical translation in a TLB 306 of the host device 220. A page table walk 512 (FIG. 5) iterates page table structures stored in the DRAM 228A of the memory system 200, determines logical-to-physical mapping, caches the mapping in the TLB 306, and resumes application execution. Further, in some embodiments, the memory system 200 manipulates page table entries stored in the DRAM 228A to enable supporting a multiplicity of memory types (e.g. SLC, MLC, TLC, MLC, PLC, HMC) with varying latencies. A page fault handler 404 (FIG. 4) is applied to facilitate moving pages facing frequent loads and having extended latencies from a first memory type into a second faster memory type or to orchestrate cancellation or rescheduling of an application associated with pages that are loaded in an outstanding latent operation.

Figure 3:
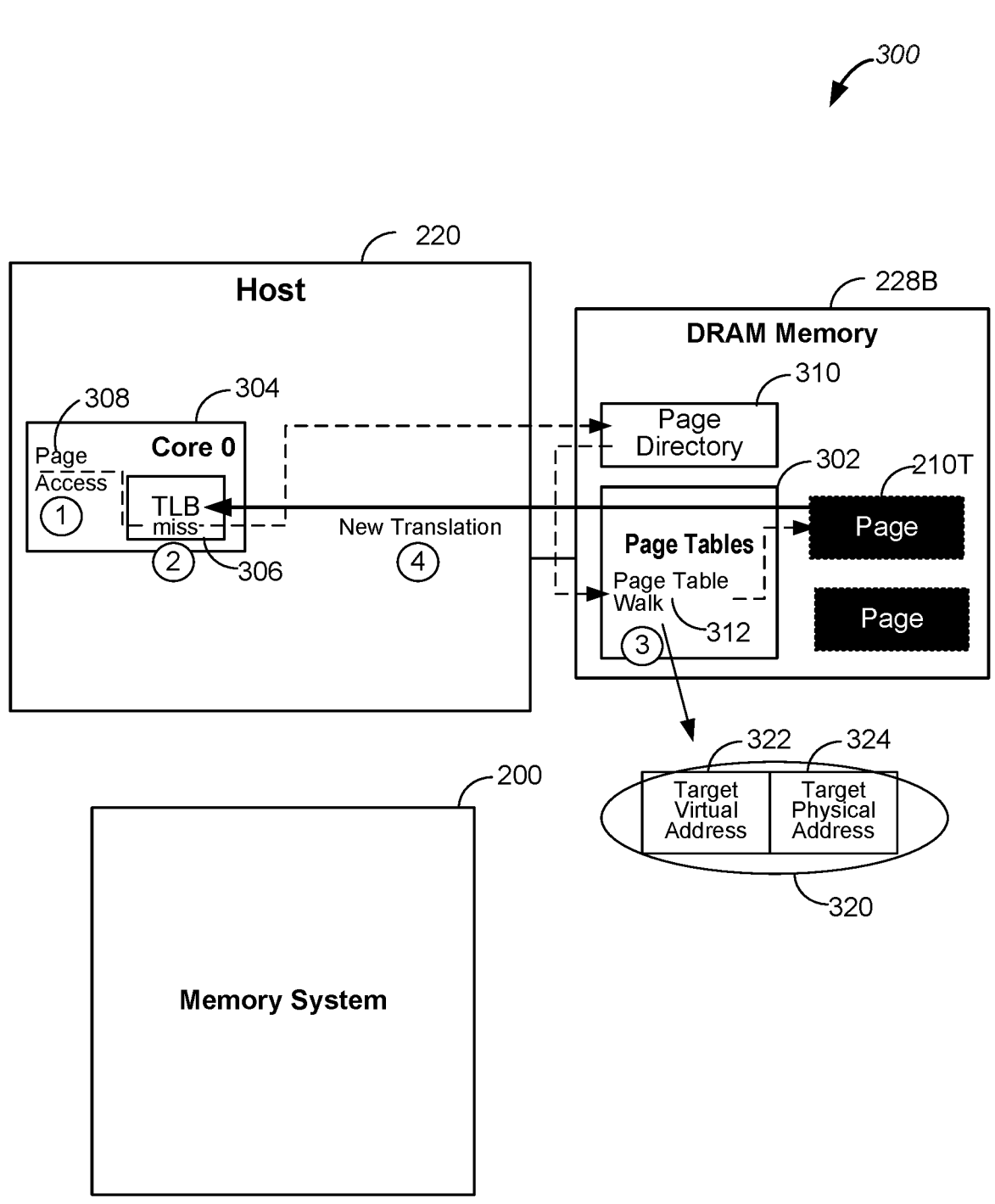
FIG. 3 is a block diagram of an example electronic system that handles a TLB miss to page tables of a host-side DRAM, in accordance with some embodiments.

FIG. 3 is a block diagram of an example electronic system 300 that handles a TLB miss to page tables 302 of a host-side DRAM 228B, in accordance with some embodiments. The electronic system 300 includes a host device 220 and a memory system 200 coupled to the host device 220. Examples of the host device includes a processor module 102 and an I/O controller 106 (FIG. 1). The host device 220 includes a processor core 304, and the processor core 304 further includes a TLB 306 that stores recent translations of virtual addresses to physical addresses in the host-side DRAM 228B or a memory system 200. In some situations, the host device issues a memory access request 308 for target data stored in the electronic system 300, and the memory access request 308 includes a target virtual address 322 of the target data. For example, the target data is stored on a memory page 210T, and the target virtual address 322 corresponds to the memory page 210T storing the target data. The host device 220 determines that the target virtual address 322 is not recently accessed and therefore not found in the TLB 306. The host device 220 has a TLB miss in response to the memory access request 308.

In some embodiments, the host-side DRAM 228B further stores one or more page tables 302 and a page directory 310. The one or more page tables 302 includes mappings between a plurality of virtual addresses and a plurality of physical addresses of the host-side DRAM 228B and the memory system 200. Each page table 302 includes a plurality of page entries, and each page entry points to a physical address of a memory page 210 (FIG. 2). The page directory 310 is distinct from the page table 302 and includes a plurality of directory entries, and each directory entry points to a respective one of the one or more page tables 302. In response to detection of the TLB miss, the host device 220 uses a first subset of bits (e.g., bits 31:22) of the target virtual address 322 to index into the page directory 310 to identify a target page table 302. A second subset of bits (e.g., bits 21:0) of the target virtual address 322 is used to index into the target page table 302 in a page table walk 312 to identify a page table entry 320 including the target physical address 324 of the target memory page 210T storing the target data.

In response to the memory access request 308, the host device 220 extracts the target data from the target memory page 210T based on the target physical address 324. Additionally, the target virtual address 322 and the target physical address 324 of the target memory page 210T storing the target data are stored in the TLB 306 as recently accessed addresses to speed up subsequent memory access request 308.

Figure 4:
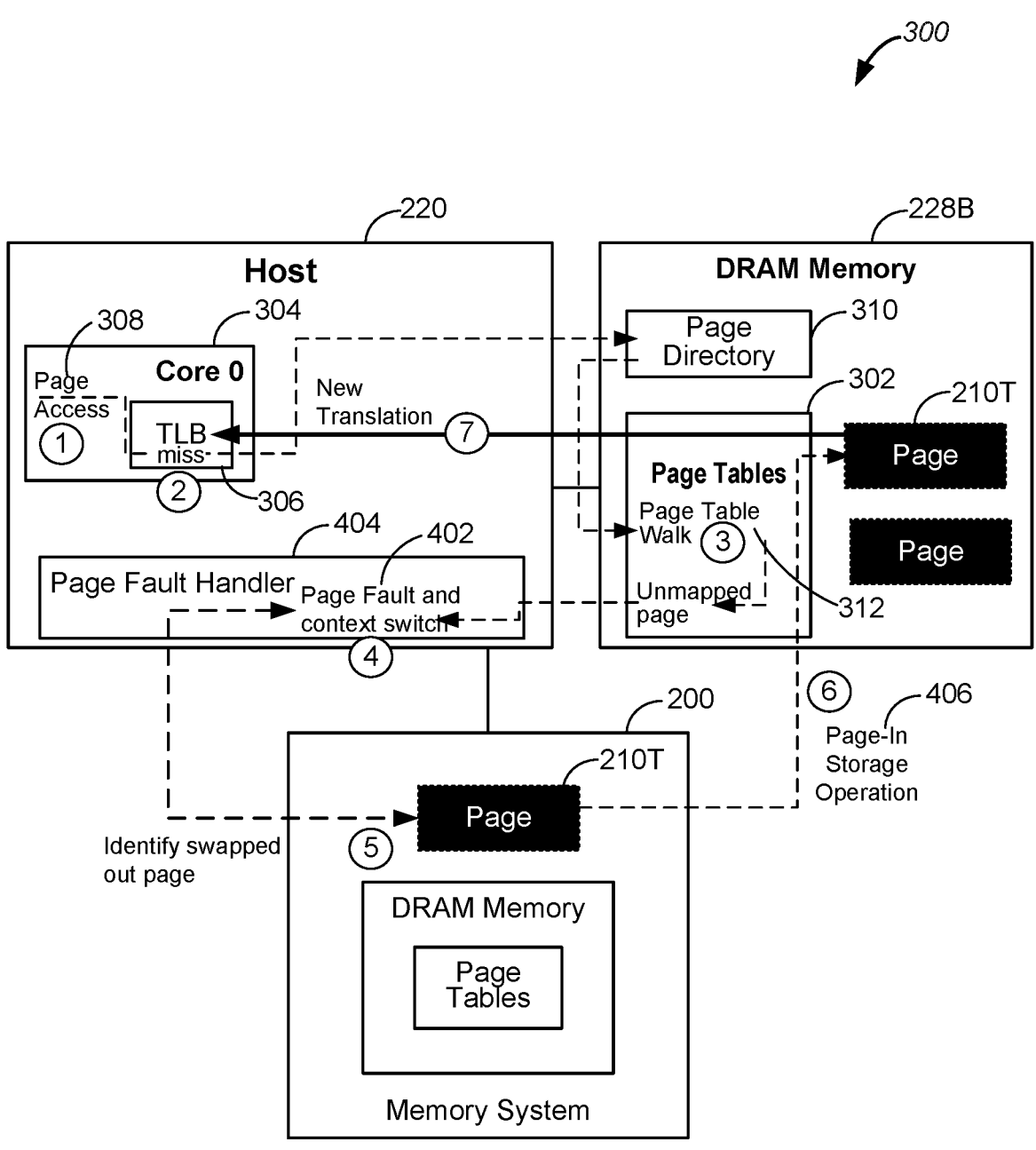
FIG. 4 is a block diagram of another example electronic system that handles a TLB miss and identifies an unmapped page in a memory system, in accordance with some embodiments.

FIG. 4 is a block diagram of another example electronic system 300 that handles a TLB miss and identifies an unmapped page in a memory system 200, in accordance with some embodiments. The electronic system 300 includes a host device 220 and a memory system 200 coupled to the host device 220. The host device 220 includes a processor core 304, and the processor core 304 further includes a TLB 306 that stores recent translations of virtual addresses to physical addresses in the host-side DRAM 228B or a memory system 200. In some situations, the host device issues a memory access request 308 for target data stored in the electronic system 300, and the memory access request 308 includes a target virtual address 322 of the target data stored on a memory page 210T. The host device 220 determines that the target virtual address 322 is not recently accessed and therefore not found in the TLB 306. The host device 220 has a TLB miss in response to the memory access request 308. In response to the TLB miss, the host device 220 continues to check a page directory 310 and one or more page tables 302, which are stored in the host-side DRAM 228B. For example, the host device 220 uses a first subset of bits (e.g., bits 31:22) to index into the page directory 310 to identify a target page table 302. A second subset of bits (e.g., bits 21:0) of the target virtual address 322 is used to index into the target page table 302 via a page table walk 312. The host device 220 finds the page table entry identifying the physical page address, and the page table entry contains metadata flags indicating the physical page is in an unmapped state. Stated another way, the target memory page 210T is an unmapped page in the host-side DRAM 228B.

In accordance with a determination that the target memory page 210T is an unmapped page in the DRAM 228B, a page fault and hardware context switch 402 invokes the page fault handler 404 of the host device 220. The page fault handler 404 forwards the memory access request 308 to the memory system 200 coupled to the host device 220. In response to the memory access request 308, the memory system 200 identifies the target page 210T from the page table entry with the unmapped flag set, and provides the target page 210T to the page fault handler of the host device 220. The target page 210T is further stored into the host-side DRAM 228B via a page-in direct memory access operation. The page directory 310 and page tables 302 are updated to include a mapping between the target virtual address 322 and the target physical address 324 of the target page 210T. Additionally, the target virtual address 322 and the target physical address 324 of the target memory page 210T storing the target data are also stored in the TLB 306 as recently accessed addresses to speed up subsequent memory access request 308 for the target data.

Figure 5:
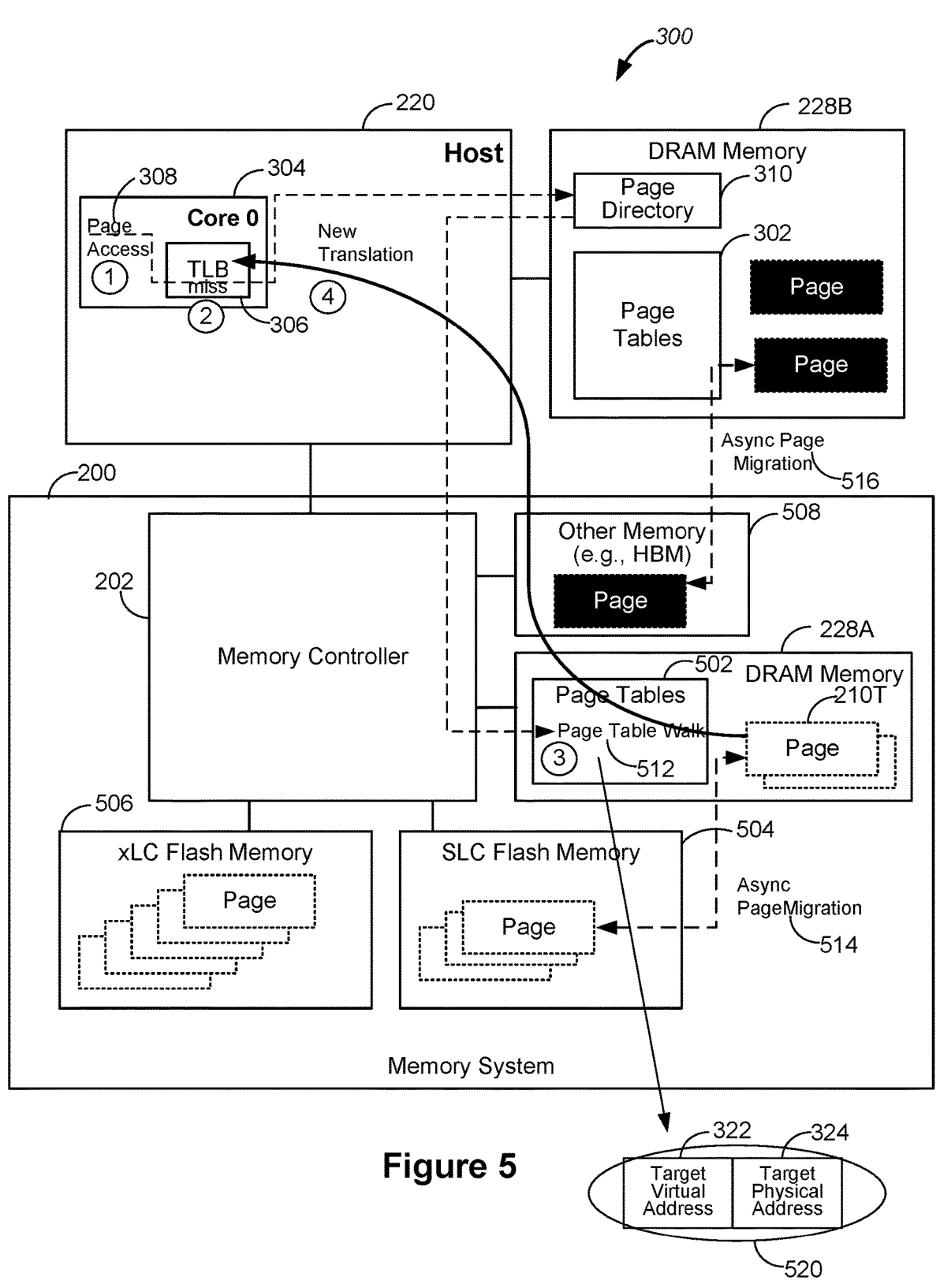
FIG. 5 is a block diagram of an example electronic system that handles a TLB miss to page tables of a storage-side DRAM located in a memory system, in accordance with some embodiments.

FIG. 5 is a block diagram of an example electronic system 300 that handles a TLB miss to page tables 502 of a storage-side DRAM 228A located in a memory system 200, in accordance with some embodiments. The electronic system 300 includes a host device 220 and a memory system 200 coupled to the host device 220. The host device 220 includes a processor core 304, and the processor core 304 further includes a TLB 306 that stores recent translations of virtual addresses to physical addresses in the host-side DRAM 228B or the memory system 200. The memory system 200 further includes a memory controller 202, a storage-side DRAM 228A, one or more different types of memory. In some embodiments, the memory system 200 includes only one of an SLC memory 504 and an X-layer cell (XLC) memory, where X is greater than 1. Examples of the XLC memory include an MLC memory, a TLC memory, a QLC memory, and a PLC. In some embodiments, the XLC memory includes six or more levels. In some embodiments, the memory system 200 includes an SLC memory 504 and a QLC memory 506. In some embodiments, the memory system 200 further includes a high bandwidth memory (HBM) 508 that has a high-speed computer memory interface for 3D-stacked synchronous dynamic random-access memory (SDRAM). One or more page tables 502 is stored in the storage-side DRAM 228A, and configured to provide mappings of virtual addresses and physical addresses, e.g., at a time of a TLB miss. The one or more page tables 302 includes mappings between a plurality of virtual addresses and a plurality of physical addresses of the storage-side DRAM 228A and one or more memory channels 204 (FIG. 2) in the memory system 200.

The host device 220 issues a memory access request 308 for target data stored in the electronic system 300, and the memory access request 308 includes a target virtual address 322 of the target data. For example, the target data is stored on a memory page 210T, and the target virtual address 322 corresponds to the memory page 210T storing the target data. The host device 220 determines that the target virtual address 322 is not recently accessed and therefore not found in the TLB 306. The host device 220 has a TLB miss in response to the memory access request 308. In some embodiments, the host-side DRAM 228B further stores one or more page tables 302 and a page directory 310. The page directory 310 is coupled to both the page table(s) 302 and the page table(s) 502. Each page table 302 or 502 includes a plurality of page table entries, and each page table entry points to a physical address of a memory page 210 (FIG. 2). Each page table entry of the respective page table(s) 502 points to a physical address of a memory page 210 stored in the storage-side DRAM 228A or other memory (e.g., SLC 504, QLC 506, HBM 508) in the memory system 200. The page directory 310 is distinct from the page tables 302 and 502 and includes a plurality of table entries, and each table entry points to a respective one of the page tables 302 and 502.

In response to detection of the TLB miss, the host device 220 uses a first subset of bits (e.g., bits 31:22) of the target virtual address 322 to index into the page directory 310 to identify a target page table 302. The host device 220 further uses a second subset of bits (e.g., bits 21:0) of the target virtual address 322 to index into the target page table 502 in a page table walk 512 to identify a page table entry 520 including the target physical address 324 of the target memory page 210T storing the target data. The target physical address 324 of the target memory page 210T is returned to the host device 220. In response to the memory access request 308, the host device 220 extracts the target data from the target memory page 210T based on the target physical address 324. Additionally, the target virtual address 322 and the target physical address 324 of the target memory page 210T storing the target data are stored in the TLB 306 as recently accessed addresses to facilitate upcoming memory access request 308.

In some embodiments, an asynchronous page migration operation 514 is implemented to move memory pages among different types of memory in the memory system 200, independently of searching the page table 502 stored in the storage-side DRAM 228A for a target physical address 324 mapped to the target virtual address 322 of the target data. The memory system 200 identifies a hot memory block, e.g., which is recently accessed or frequently accessed, in memory 504, 506, or 508 of the memory system 200. The electronic system 300 further identifies a victim memory block at an updated physical address in the storage-side DRAM 228A. The victim memory block is optionally a least recently or least frequently used memory block in the storage-side DRAM 228A. In some embodiments, a memory heatmap is created for the storage-side DRAM 228A to identify the victim memory block in the storage-side DRAM 228A. The victim memory block is migrated to the memory 504, 506, or 508 of the memory system 200, and the hot memory block is migrated into the updated physical address of the storage-side DRAM 228A. The page table 502 of the storage-side DRAM 228A is updated to include a mapping between a virtual address and the updated physical address in the storage-side DRAM 228A.

Alternatively, in some embodiments, an asynchronous page migration operation 516 is implemented to move a memory page among a memory (e.g., SLC memory 504, XLC memory 506, other memory 508) in the memory system 200 to the host-side DRAM memory 228B, independently of searching the page table 502 stored in the storage-side DRAM 228A for the target virtual address 322 of the target data. The electronic system 300 identifies a hot memory block, e.g., which is recently accessed, frequently accessed, or speculatively pre-fetched, in the memory system 200. The electronic system 300 further identifies a victim memory block at an updated physical address in the host-side DRAM 228B. The victim memory block is optionally a least recently or least frequently used memory block in the host-side DRAM 228B. In some embodiments, a memory heatmap is created for the host-side DRAM 228B to identify the victim memory block in the host-side DRAM 228B. The victim memory block is migrated to the memory system 200, and the hot memory block is migrated into the updated physical address of the host-side DRAM 228B. The page table of the host-side DRAM 228B is updated to include a mapping between a virtual address and the updated physical address in the host-side DRAM.

Figure 6:
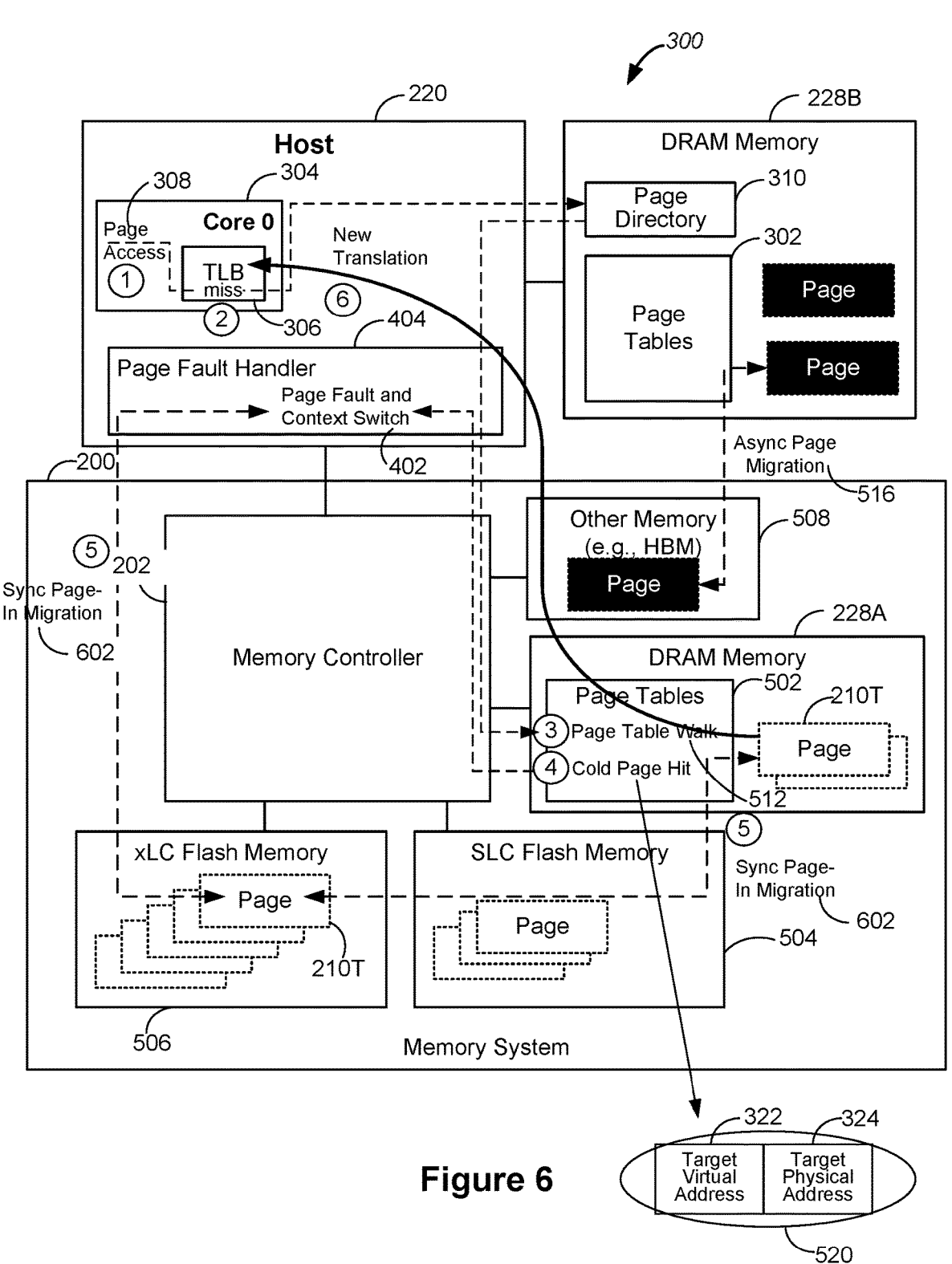
FIG. 6 is a block diagram of another example electronic system that handles a TLB miss and cold page migration in a memory system, in accordance with some embodiments.

FIG. 6 is a block diagram of another example electronic system 300 that handles a TLB miss and cold page migration in a memory system 200, in accordance with some embodiments. The electronic system 300 includes a host device 220 and a memory system 200 coupled to the host device 220. The host device 220 includes a TLB 306 that stores recent translations of virtual addresses to physical addresses in a host-side DRAM 228B or the memory system 200. The memory system 200 further includes a memory controller 202, a storage-side DRAM 228A, and one or more different types of memory. In some embodiments, the memory system 200 includes only one of an SLC memory 504 and an XLC memory, where X is greater than 1. Examples of the XLC memory include an MLC memory, a TLC memory, a QLC memory, a PLC memory, and a higher-level cell memory. In some embodiments, the memory system 200 further includes a high bandwidth memory (HBM) 508. One or more page tables 502 is stored in the storage-side DRAM 228A, and configured to provide mappings of virtual addresses and physical addresses, e.g., at a time of a TLB miss. The one or more page tables 302 includes mappings between a plurality of virtual addresses and a plurality of physical addresses of the storage-side DRAM 228A and one or more memory channels 204 in the memory system 200.

In some embodiments, the memory system 200 receives a memory access request 308 for target data stored in the memory system 200. The memory access request 308 includes a target virtual address 322 of the target data. In response to the memory access request 308, the memory system 200 searches a page table 502 of the storage-side DRAM 228A for a target physical address 324 mapped to the target virtual address 322 of the target data. Based on a search result, the memory system 200 extracts the target data stored in one of the storage-side DRAM 228A and the one or more memory channels 204 according to the target physical address 324 mapped to the target virtual address 322 in the page table 502. In some embodiments, in response to the memory access request 308 and prior to searching the page table 502, the electronic system 300 searches the page table 302 stored in the host-side DRAM 228B for the target virtual address 322 of the target data.

In some situations, the host device issues the memory access request 308 for the target data stored in the electronic system 300, and the memory access request 308 includes a target virtual address 322 of the target data stored on a memory page 210T. The host device 220 determines that the target virtual address 322 is not recently accessed and therefore not found in the TLB 306. The host device 220 has a TLB miss in response to the memory access request 308. In response to the TLB miss, the host device 220 continues to check a page directory 310 and the page table 502, which is stored in the storage-side DRAM 228A. The page directory 310 is a higher level of the page table 502. For example, the host device 220) uses a first subset of bits (e.g., bits 31:22) to index into the page directory 310 to identify a target page table 302. A second subset of bits (e.g., bits 21:0) of the target virtual address 322 is used to index into the target page table 502 via a page table walk 512. In some embodiments, the host-side DRAM 228B further includes a target directory entry indicating that a page table 502 mapping the target physical address 324 and the target virtual address 322 is located in the memory system 200, and the page table 502 of the storage-side DRAM 228A is searched in response to identifying the target directory entry in the page directory 310 of the host-side DRAM 228B. In some embodiments, the page directory 310 is part of the page tables 302, and has a higher level than the remaining page tables 302.

In some embodiments, the page table 502 includes a page table entry 520 indicating that the target physical address 324 of the target memory page 210T is in the DRAM memory 228A. Stated another way, the search result in the page table 502 includes a mapped page table entry, and in accordance with the contents of the page table entry, the memory system 200 identifies the target physical address 324 corresponding to the target virtual address 322 in the storage-side DRAM 228A based on the page table 502 and extracts the target data that is stored in the storage-side DRAM 228A according to the target physical address 324. Alternatively, in some embodiments (FIG. 6), the page table 502 includes a page table entry 520 indicating that the target physical address 324 of the target memory page 210T is in memory (e.g., the SLC 504, the XLC memory 506) distinct form the storage-side DRAM 228A. The host device 220 identifies the target physical address 324 of the target memory page 210T and identifies the target data as a cold page by examining the page table entry flags. Stated another way, the search result includes a page table with flags indicating that the physical page is unmapped, the memory system 200 identifies the target physical address 324 corresponding to the target virtual address 322 in the one or more memory channels 204 of the memory 504, 506, or 508 and extracts the target data that is stored in the one or more memory channels 204 according to the target physical address 324. Further, in some embodiments, the one or more memory channels 204 include one or more of an SLC memory 504 and an XLC memory, where X is greater than 1. Examples of the XLC memory include an MLC memory, a TLC memory, a QLC memory, a PLC memory, and a higher-level cell memory.

In accordance with a determination that the target memory page 210T corresponds to a cold page external to the DRAM 228B, a page fault occurs, invoking the page fault handler 404 of the host device 220. The memory system 200 provides the target page 210T stored external to the DRAM 228B and in the memory system 200 to the page fault handler 404 of the host device 220 in a page-in migration operation 602. The target page 210T is also stored into the host-side DRAM 228B via the page-in storage operation 602. The page table 502 is updated to include a mapping between the target virtual address 322 and the target physical address 324 of the target page 210T. Additionally, the target virtual address 322 and the target physical address 324 of the target memory page 210T storing the target data are also stored in the TLB 306 as recently accessed addresses to speed up subsequent memory access request 308 for the target data.

In some embodiments not shown, the storage-side DRAM 228A further includes a page directory that is a higher level of the page table. The host device 220 checks the page directory to identify the page table 502. After the page table 502 is searched, the target physical address 324 corresponding to the target virtual address 322 is identified in a page table entry 520 of the page table 502. Optionally, the host device 220 checks the page directory 310 in the host-side DRAM 228B before checking the page directory of the storage-side DRAM 228A. Optionally, the host device 220 checks the page directory of the storage-side DRAM 228A directly in response to a TLB miss.

Referring to FIG. 6, in some embodiments, the page-in storage operation 602 is associated and synchronized with the page table 512 in the page table 502. One or more memory channels 204 of the memory system 200 include at least a first memory (e.g., DRAM 228A) in which each memory cell has a first latency and a second memory (e.g., SLC memory 504, XLC memory 506) in which each memory cell has a second latency, and the second latency is greater than the first latency. The memory system 200 determines that the second memory includes the target physical address 324 and is unmapped for the target data. In accordance with a determination that the second memory is unmapped, the memory system 200 moves the target data from the target physical address 324 of the second memory to an updated physical address of the first memory, and updates the page table 502 to store a mapping between the target virtual address 322 of the target data and the updated physical address to the first memory. Every virtual address in the page table 502 points to a memory page 210 in one of the different memory types coupled to the memory controller 202 (e.g., DRAM 228A. SLC memory 504. XLC memory 506). In some embodiments, for a slower memory (e.g., SLC. XLC) of the first and second memories, a page table entry 520 is left in an unmapped state corresponding to a flag, and a pointer to the target physical address 324, where the target data is stored, is present in a page table entry 520. Because the page table entry 520 is unmapped, the memory system 200 takes a page fault on the memory access, allowing a page fault software to move the target data from the target physical address 324 of the second memory having a higher latency to a lower latency memory location (e.g., DRAM 228A). The page table 502 is updated to reflect that the target virtual address 322 of the memory page 210) including the target data is mapped to the lower latency memory location.

Further, in some embodiments, the first memory includes the storage-side DRAM 228A and is full. The memory system 200 selects a victim memory block stored in the updated target physical address 324 in the storage-side DRAM 228A. The memory system 200 moves the victim memory block to the one or more memory channels 204, and stores the target memory block corresponding to the target physical address 324 in place of the victim memory block in the storage-side DRAM 228A. The page table 502 of the storage-side DRAM 228A is updated to include a mapping between the target virtual address 322 and the updated target physical address 324 in the storage-side DRAM 228A. In some embodiments, the victim memory block is the least recently used memory block or the least frequently accessed memory block. A memory heatmap is created for the storage-side DRAM 228A to identify the victim memory block in the storage-side DRAM 228A.

In some embodiments, the host-side DRAM 228B applies one of a double data rate (DDR) data interface, a graphics DDR (GDDR) data interface, and a low-power DDR (LPDDR) data interface. In some embodiments, the storage-side DRAM 228A applies one of a DDR data interface, a GDDR data interface, and an LPDDR data interface. Further, in some embodiments, the host-side DRAM 228B and the storage-side DRAM 228A apply the same type of data interfaces. Conversely, in some embodiments, the host-side DRAM 228B and the storage-side DRAM 228A apply different types of data interfaces.

FIG. 7 is a flow diagram of an example method 700 for accessing data in a memory system 200, in accordance with some embodiments. An electronic system 300 includes a host device 220 and the memory system 200 coupled to the host device 220. The memory system 200 receives (operation 702) a memory access request 308 for target data stored in the memory system 200. The memory access request 308 includes (operation 704) a target virtual address 322 of the target data. The memory system 200 includes (operation 706) a storage-side DRAM 228A and one or more memory channels 204 (FIG. 2). In response to the memory access request 308, the memory system 200 searches (operation 708) a page table 502 of the storage-side DRAM 228A (FIG. 5) for a target physical address 324 mapped to the target virtual address 322 of the target data. The page table 502 includes (operation 710) mappings between a plurality of virtual addresses and a plurality of physical addresses. Based on a search result, the memory system 200 extracts (operation 712) the target data stored in one of the storage-side DRAM 228A and the one or more memory channels 204 according to the target physical address 324 mapped to the target virtual address 322 in the page table 502. In some embodiments, after the page table 502 is searched, the target physical address 324 corresponding to the target virtual address 322 is identified in a page table entry 520 of the page table 502 (FIG. 5).

In some embodiments, the search result includes a page table hit, which simply means the page table entry for the target physical page is in a mapped state. The memory system 200 extracts the target data by, in accordance with the page table hit, identifying the target physical address 324 corresponding to the target virtual address 322 in the storage-side DRAM 228A based on the page table 502 and extracting the target data that is stored in the storage-side DRAM 228A according to the target physical address 324.

In some embodiments, the search result includes a page table miss, which simply means the page table entry for the target physical address is in an unmapped state. The memory device extracts the target data by, in accordance with the page table miss, identifying the target physical address 324 corresponding to the target virtual address 322 in the one or more memory channels 204 and extracting the target data that is stored in the one or more memory channels 204 according to the target physical address 324. Further, in some embodiments, the one or more memory channels 204 include one or more of a single-level cell (SLC) memory, a multiple-level cell (MLC) memory, a triple-level cell (TLC) memory, a quad-level cell (QLC) memory, a penta-level memory (PLC), and a higher-level cell memory, and the target physical address 324 of the target data is identified in the one or more memory channels 204.

In some embodiments, the one or more memory channels 204 include at least a first memory (e.g., DRAM 228A) in which each memory cell has a first latency and a second memory (e.g., QLC memory 506) in which each memory cell has a second latency. The second latency is greater than the first latency The memory device extracts the target data by determining that the second memory includes the target physical address 324 and is unmapped for the target data: in accordance with a determination that the second memory is unmapped in the first memory, moving the target data from the target physical address 324 of the second memory to an updated physical address of the first memory; and updating the page table 502 to store a mapping between the target virtual address 322 of the target data and the updated physical address to the first memory.

In some embodiments associated with a synchronous page-in migration operation 602 (FIG. 6), the memory device selects a victim memory block stored in an updated target physical address 324 in the storage-side DRAM 228A, moves the victim memory block to the one or more memory channels 204, stores a target memory block corresponding to the target physical address 324 in place of the victim memory block in the storage-side DRAM 228A, and updates the page table 502 of the storage-side DRAM 228A to include a mapping between the target virtual address 322 and the updated target physical address 324 in the storage-side DRAM 228A.

In some embodiments, the page table 502 of the storage-side DRAM 228A includes a supplemental page table 502. The memory system 200 is coupled to a host device 220) having a host-side DRAM 228B, and the host-side DRAM 228B is distinct from the storage-side DRAM 228A. The host-side DRAM 228B has a host page table 302. Further, in some embodiments, in response to the memory access request 308 and prior to searching the supplemental page table 502, the host device 220 searches the host page table 302 stored in the host-side DRAM 228B for the target physical address 324 mapped to the target virtual address 322 of the target data. The host page table 302 includes mappings between a plurality of virtual addresses and a plurality of physical addresses of the host-side DRAM 228B. The supplemental page table 502 is searched in accordance with a page table miss in the host page table 302.

In some embodiments, the host-side DRAM 228B further includes a page directory 310 that is a higher level of the page table 502. The page directory 310 further includes a target directory entry indicating that a page table 502 mapping the target physical address 324 and the target virtual address 322 is located in the memory system 200. The supplemental page table 502 of the storage-side DRAM 228A is searched in response to identifying the target directory entry in the page directory 310 of the host-side DRAM 228B.

Further, in some embodiments, the host-side DRAM 228B uses a first double data rate (DDR) interface, and the storage-side DRAM 228A uses a second DDR interface that is distinct from the first DDR interface.

In some embodiments, the memory system 200 is coupled to a host device 220 having a TLB 306 that stores a plurality of recent translations of virtual addresses to physical addresses. After extracting the target data, the host device 220 stores a first recent translation of the target virtual address 322 to the target physical address 324 of the memory system 200 among the plurality of recent translations in the TLB 306.

In some embodiments associated with associated with an asynchronous page migration operation 514 (FIG. 5), the memory system 200 identifies a hot memory block in the one or more memory channels 204, migrates the hot memory block into an updated physical address of the storage-side DRAM 228A, and updates the page table 502 of the storage-side DRAM 228A to include a mapping between a virtual address and the updated physical address in the storage-side DRAM 228A.

In some embodiments associated with associated with an asynchronous page migration operation 516 (FIGS. 5 and 6), the memory system 200 identifies a hot memory block in the memory system 200 200, identifies a victim memory block at an updated physical address in a host-side DRAM 228B distinct from the memory system 200, migrates the victim memory block to the memory system 200, migrates the hot memory block into the updated physical address of the host-side DRAM 228B, updates a page table 302 of the host-side DRAM 228B to include a mapping between a virtual address and the updated physical address in the host-side DRAM 228B.

In some embodiments, the memory system 200 is coupled to a host device 220 via a computer express link (CXL) that operates in compliance with a high-speed computer interconnect interface standard.

In another aspect of the application, a memory system 200 includes a memory controller 202, a storage-side DRAM 228A, and one or more memory channels 204. The memory controller is configured to receive a memory access request 308 for target data stored in the memory system 200. The memory access request 308 further includes a target virtual address 322 of the target data. The storage-side DRAM 228A is coupled to the memory controller and includes a page table 502. The page table 502 includes mappings between a plurality of virtual addresses and a plurality of physical addresses, and the storage-side DRAM 228A is configured to in response to the memory access request 308, search the page table 502 stored in the storage-side DRAM 228A for the target physical address 324 mapped to the target virtual address 322 of the target data. The one or more memory channels 204 are coupled to the memory controller, and the storage-side DRAM 228A and the one or more memory channels 204 are configured to provide the target data based on a search result.

In yet another aspect of the application, an electronic system includes a host device 220 including one or more processors and a memory system 200. The memory system 200 is configured to receive a memory access request 308 for target data stored in the memory system 200. The memory access request 308 includes a target virtual address 322 of the target data, and the memory system 200 includes a storage-side DRAM 228A and one or more memory channels 204. The memory system 200 is further configured to in response to the memory access request 308, search a page table 502 of the storage-side DRAM 228A for the target virtual address 322 of the target data. The page table 502 includes mappings between a plurality of virtual addresses and a plurality of physical addresses. The memory system 200 is further configured to, based on a search result, extract the target data stored in one of the storage-side DRAM 228A and the one or more memory channels 204 according to the target physical address 324 mapped to the target virtual address 322 in the page table 502.

In some embodiments, the method 700 requires kernel support for page table location as well as enhancements to a kernel page fault handler. These are enabled in software based on some standardized assessment of the memory system's capability (which would easily be detected since its orchestrated by software over a CXL bus).

Memory is also used to store instructions and data associated with the method 700, and includes high-speed random-access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory, optionally, includes one or more storage devices remotely located from one or more processing units. Memory, or alternatively the non-volatile memory within memory, includes a non-transitory computer readable storage medium. In some embodiments, memory, or the non-transitory computer readable storage medium of memory, stores the programs, modules, and data structures, or a subset or superset for implementing method 600.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory, optionally, stores a subset of the modules and data structures identified above. Furthermore, the memory, optionally, stores additional modules and data structures not described above.

The terminology used in the description of the various described implementations herein is for the purpose of describing particular implementations only and is not intended to be limiting. As used in the description of the various described implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method for accessing data in a memory system, the method comprising:
   receiving a memory access request for target data stored in the memory system, wherein the memory access request includes a target virtual address of the target data, and the memory system includes a storage-side dynamic random-access memory (DRAM) and one or more memory channels; and in response to the memory access request:

searching a page table of the storage-side DRAM for a target physical address mapped to the target virtual address of the target data, wherein the page table includes mappings between a plurality of virtual addresses and a plurality of physical addresses; and based on a search result, extracting the target data stored in one of the storage-side DRAM and the one or more memory channels according to the target physical address in the page table;

wherein the memory system is coupled to a host device including a translation lookaside buffer (TLB) that stores a plurality of recent translations of virtual addresses to physical addresses, and the host device is configured to, after extracting the target data, store a first recent translation of the target virtual address to the target physical address of the memory system among the plurality of recent translations in the TLB.

2. The method of claim 1, wherein the search result includes a page table hit, and extracting the target data further comprises, in accordance with the page table hit:

identifying the target physical address corresponding to the target virtual address in the storage-side DRAM based on the page table; and extracting the target data that is stored in the storage-side DRAM according to the target physical address.

3. The method of claim 1, wherein the search result includes a page table miss, and extracting the target data further comprises, in accordance with the page table miss:

identifying the target physical address corresponding to the target virtual address in the one or more memory channels; and extracting the target data that is stored in the one or more memory channels according to the target physical address.

4. The method of claim 3, wherein the one or more memory channels include one or more of a single-level cell (SLC) memory, a multiple-level cell (MLC) memory, a triple-level cell (TLC) memory, a quad-level cell (QLC) memory, a penta-level memory (PLC), and a higher-level cell memory, and the target physical address of the target data is identified in the one or more memory channels.

5. The method of claim 3, wherein the one or more memory channels include at least a first memory in which each memory cell has a first latency and a second memory in which each memory cell has a second latency, the second latency greater than the first latency, extracting the target data further comprising:

determining that the second memory includes the target physical address and is unmapped for the target data; and in accordance with a determination that the second memory is unmapped in the first memory, moving the target data from the target physical address of the second memory to an updated physical address of the first memory, and updating the page table to store a mapping between the target virtual address of the target data and the updated physical address to the first memory.

6. The method of claim 3, further comprising:

selecting a victim memory block stored in an updated target physical address in the storage-side DRAM;

copying the victim memory block to the one or more memory channels;

storing a target memory block corresponding to the target physical address in place of the victim memory block in the storage-side DRAM; and updating the page table of the storage-side DRAM to include a mapping between the target virtual address and the updated target physical address in the storage-side DRAM.

7. The method of claim 1, wherein after the page table is searched, the target physical address corresponding to the target virtual address is identified in a page table entry of the page table.

8. The method of claim 1, wherein:

the page table of the storage-side DRAM includes a supplemental page table;

a host-side DRAM of the host device is distinct from the storage-side DRAM; and the host-side DRAM has a host page table.

9. The method of claim 8, further comprising, in response to the memory access request and prior to searching the supplemental page table:

searching the host page table stored in the host-side DRAM for the target physical address mapped to the target virtual address of the target data, wherein the host page table includes mappings between a plurality of virtual addresses and a plurality of physical addresses of the host-side DRAM;

wherein the supplemental page table is searched in accordance with a page table miss in the host page table.

10. The method of claim 1, wherein:

a host-side DRAM of the host device further includes a page directory that is a higher level of the page table;

the page directory further includes a target directory entry indicating that the page table mapping the target physical address and the target virtual address is located in the memory system; and the page table of the storage-side DRAM is searched in response to identifying the target directory entry in the page directory of the host-side DRAM.

11. The method of claim 10, wherein the host-side DRAM uses a first double data rate (DDR) interface, and the storage-side DRAM uses a second DDR interface that is distinct from the first DDR interface.

12. A memory system, comprising:

a memory controller configured to receive a memory access request for target data stored in the memory system, wherein the memory access request further includes a target virtual address of the target data;

a storage-side DRAM coupled to the memory controller and including a page table, wherein the page table includes mappings between a plurality of virtual addresses and a plurality of physical addresses, and the storage-side DRAM is configured to in response to the memory access request, search the page table stored in the storage-side DRAM for a target physical address mapped to the target virtual address of the target data; and one or more memory channels coupled to the memory controller, wherein the storage-side DRAM and the one or more memory channels are configured to provide the target data based on a search result;

wherein the memory system is coupled to a host device including a translation lookaside buffer (TLB) that stores a plurality of recent translations of virtual addresses to physical addresses, and the host device is configured to, after extracting the target data, store a first recent translation of the target virtual address to the target physical address of the memory system among the plurality of recent translations in the TLB.

13. The memory system of claim 12, wherein the memory system is configured for:

identifying a hot memory block in the one or more memory channels;

migrating the hot memory block into an updated physical address of the storage-side DRAM; and updating the page table of the storage-side DRAM to include a mapping between a virtual address and the updated physical address in the storage-side DRAM.

14. The memory system of claim 12, wherein the search result includes a page table hit, and extracting the target data further comprises, in accordance with the page table hit:

identifying the target physical address corresponding to the target virtual address in the storage-side DRAM based on the page table; and extracting the target data that is stored in the storage-side DRAM according to the target physical address.

15. The memory system of claim 12, wherein the search result includes a page table miss, and extracting the target data further comprises, in accordance with the page table miss:

identifying the target physical address corresponding to the target virtual address in the one or more memory channels; and extracting the target data that is stored in the one or more memory channels according to the target physical address.

16. The memory system of claim 12, wherein the search result includes a page table hit, and extracting the target data further comprises, in accordance with the page table hit:

identifying the target physical address corresponding to the target virtual address in the storage-side DRAM based on the page table; and extracting the target data that is stored in the storage-side DRAM according to the target physical address.

17. An electronic system, comprising:

a memory system configured to:

receive a memory access request for target data stored in the memory system, wherein the memory access request includes a target virtual address of the target data, and the memory system includes a storage-side DRAM and one or more memory channels; and in response to the memory access request:

search a page table of the storage-side DRAM for a target physical address mapped to the target virtual address of the target data, wherein the page table includes mappings between a plurality of virtual addresses and a plurality of physical addresses; and based on a search result, extract the target data stored in one of the storage-side DRAM and the one or more memory channels according to the target physical address in the page table; and a host device coupled to the memory system and including one or more processors, wherein the host device includes a translation lookaside buffer (TLB) that stores a plurality of recent translations of virtual addresses to physical addresses, and is configured to, after extracting the target data, store a first recent translation of the target virtual address to the target physical address of the memory system among the plurality of recent translations in the TLB.

18. The electronic system of claim 17, wherein the electronic system is configured for:

identifying a hot memory block in the memory system;

identifying a victim memory block at an updated physical address in a host-side DRAM distinct from the memory system;

migrating the victim memory block to the memory system;

migrating the hot memory block into the updated physical address of the host-side DRAM; and updating a page table of the host-side DRAM to include a mapping between a virtual address and the updated physical address in the host-side DRAM.

19. The electronic system of claim 17, wherein the memory system is coupled to the host device via a computer express link (CXL) that operates in compliance with a high-speed computer interconnect interface standard.

20. The electronic system of claim 17, wherein:

the page table of the storage-side DRAM includes a supplemental page table;

the host device includes a host-side DRAM, and the host-side DRAM is distinct from the storage-side DRAM; and the host-side DRAM has a host page table.

* * * * *